Aug. 27, 1957   L. R. DONKLE   2,804,487
PRODUCTION OF BUTADIENE
Filed June 29, 1954
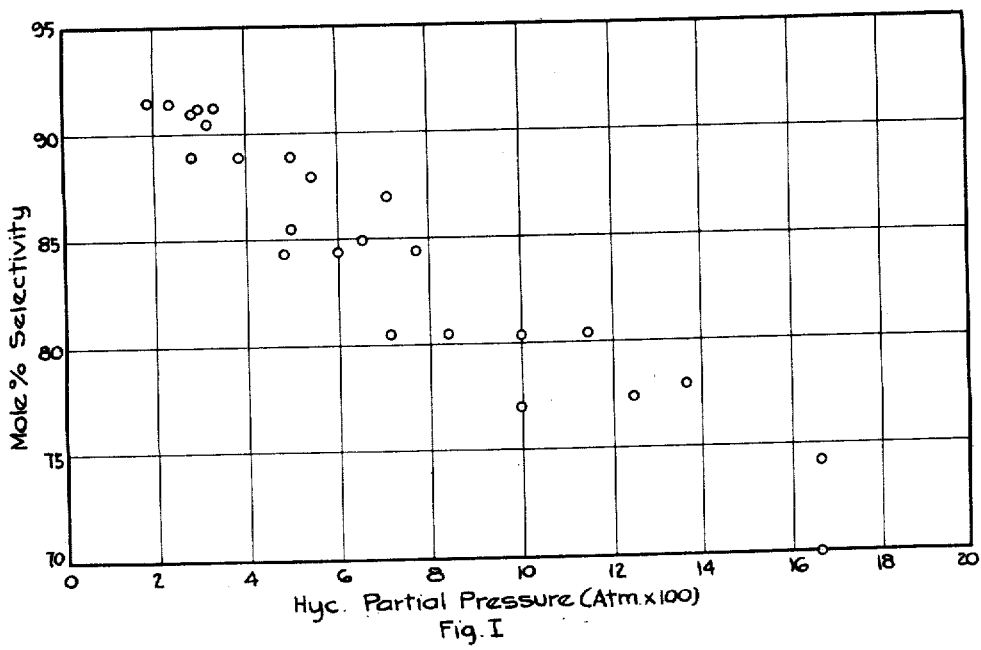
Fig. I
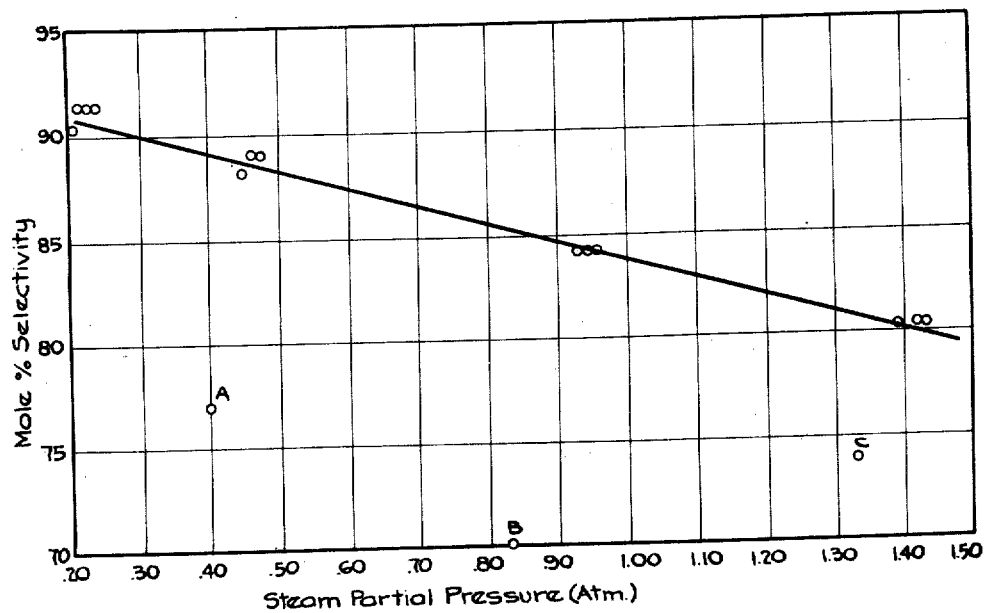
Fig. II
INVENTOR
LLOYD R. DONKLE
BY: James Todorovic
HIS ATTORNEY _United States Patent Office_ 2,804,487
Patented Aug. 27, 1957

2,804,487

PRODUCTION OF BUTADIENE

Lloyd R. Donkle, Long Beach, Calif., assignor to Shell Development Company, New York, N. Y., a corporation of Delaware Application June 29, 1954, Serial No. 440,078

2 Claims. (Cl. 260—680)

This invention relates to the production of butadiene by the catalytic dehydrogenation of butylene with an alkalized dehydrogenation catalyst in the presence of steam.

The object of the invention is to provide an improved method of operation whereby a more selective conversion of butylene to the desired butadiene may be obtained. A further object is to provide an improved method of operation wherein less steam is required.

While various possible dehydrogenation processes have been proposed for the dehydrogenation of butylene to butadiene, the process used commercially during and since the late World War involves the dehydrogenation of butylene in the presence of steam diluent with an alkalized dehydrogenation catalyst at temperatures of the order of 600° C.

In this process, as contrasted to other dehydrogenation processes, the conjunct use of steam diluent and an alkalized catalyst is essential. The catalyst may be alkalized with an alkaline compound of one of the alkali metals or one of the alkaline earth metals. During the conditions of use the metal, irrespective of the form in which it was incorporated in the catalyst, is converted largely to the oxide and carbonate. In general, potassium oxide or potassium carbonate is used. The amount of alkali is not critical. Thus, amounts ranging from about 1% up to about 35% potassium carbonate have been used. In general, concentrations of 10 to about 35% potassium carbonate are preferred. The alkali apparently catalyzes the reaction of the steam with side reaction products which would otherwise quickly render the catalyst inactive.

The dehydrogenation component of the catalyst is generally iron oxide or chromium oxide, or a mixture of the two, but other known dehydrogenation promoters may be used. The catalyst may consist only of the dehydrogenation component and the alkali, or it may contain a relatively inactive diluent or support material such as magnesium oxide, or the like. Thus, the catalyst originally used in the process (known as 1707 Catalyst) consisted of a large proportion of magnesium oxide carrier supporting small amounts of iron oxide, potassium oxide, and copper oxide. Later a catalyst consisting of iron oxide, chromium oxide, and potassium carbonate (known as 105 Catalyst) was widely used. Presently a catalyst of similar composition but containing a larger proportion of potassium carbonate (known as 205 Catalyst) is widely used. The catalyst is generally in the form of pellets of from 3/16 inch to 3/8 inch diameter.

The feed to the process is a mixture of normal butylenes consisting largely of butene-2. In commercial practice the butylene contains small percentages of isobutene and butane, but these are undesirable constituents, and are separated as far as commercially practicable.

The butylene feed and superheated steam are mixed and passed through a bed of the catalyst. The temperature is of the order of 600° C. Generally a somewhat lower temperature, e. g., 580° C., is used when the catalyst is fresh and the temperature is gradually raised to maintain a constant conversion as the activity of the catalyst declines during use. In commercial practice the catalyst is discarded when the temperature required to maintain the conversion reaches about 630° C. This usually requires at least several months.

In commercial practice the amount of steam used is from about 10 to 15 moles per mole of hydrocarbon feed. The mixture is normally introduced into the reaction zone at a moderate pressure of, for example, from about 6 to 15 p. s. i. g.

Aside from the desired dehydrogenation of butylene to butadiene, the process is considered to involve 10 other reactions which are:

1. Non-catalytic cracking of n-butenes.
2. Non-catalytic cracking of n-butane.
3. Non-catalytic cracking of butadiene.
4. Non-catalytic polymerization of butadiene, and depolymerization of butadiene dimer.
5. Non-catalytic cracking of butadiene dimer.
6. Catalytic cracking of butadiene.
7. Catalytic polymerization of butadiene.
8. Catalytic cracking of butadiene dimer.
9. Catalytic cracking of n-butene.
10. Water gas reaction.

These are listed and discussed at length by L. M. Beckberger and K. M. Watson (Chemical Engineering Progress 544, No. 3, pages 229–248, March 1948). As a consequence of these side reactions, the process is not very selective, i. e., an appreciable proportion of the butylene reacted is converted to undesired products which not only consume valuable butylene but also increase the cost of recovering the desired butadiene from the reaction mixture. The selectivity of the process decreases rather steeply with increasing extent of conversion of the butylene feed. Because of the high cost of the butylene feed and the processing required to recover the butadiene from the reaction mixture, the selectivity of the process is a more important factor than the degree of conversion. Consequently, it is the practice to maintain the conversion at a low level in order to achieve a high selectivity. Thus, the conversion is normally maintained at a constant figure between about 20 and 35% per pass. For purposes of comparison, a conversion of 20% is generally used.

Space velocities of the order of 300 to 350 volumes per volume per hour normally give conversions in the desired range. The space velocity and steam dilution ratio are normally held constant, e. g., at 350 v./v./hour and 12:1, and the conversion is adjusted to the desired value as previously explained by adjusting the temperature.

The process has been subjected to rather extensive study in view of its importance, and the results of this study are reported in detail with numerous graphs by L. H. Beckberger and K. M. Watson in the paper referred to above. Also details of the operation and results obtained in the various plants are interchanged under the auspices of the RFC Office of Synthetic Rubber. With such study and cooperation over a period of years, it is apparent that the present results are the best of which the industry is capable under the existing state of knowledge. A typical result is obtained under the above described conditions and corresponds to a selectivity of about 80% at a conversion of 20%.

It has hitherto been the belief that the selectivity of the process is largely a function of the partial pressure of hydrocarbon feed in the reaction zone. The use of large amounts of steam to reduce the partial pressure of hydrocarbon has therefore been considered desirable. There is indeed a sort of correlation with the partial pressure of the hydrocarbon as is shown by the results plotted in the graph, Figure I, of the accompanying drawing.

Figure I

Figure I of the accompanying drawing is a graph in which the conversion efficiencies in mole percent at 20% conversion and 350 v./v./hr. space velocity are given on the ordinate, the partial pressures of hydrocarbon in atmospheres × 100 are given on the abscissa, and in which are plotted various results obtained with the same catalyst and feed under conditions giving different partial pressures of hydrocarbons.

Referring to Figure I, it is seen that there is a general trend toward better selectivity with decreasing partial pressure of the hydrocarbon. It is evident however that the partial pressure of the hydrocarbon is not the controlling factor. This is even more clearly shown by the following experiments:

Butylene was dehydrogenated with a commercial $Fe_2O_3$—$Cr_2O_3$—$K_2CO_3$ catalyst at a space velocity of 350 v./v./hr. at a temperature adjusted to give 20% conversion. The outlet pressure of the hydrocarbon-steam mixture was about 7 p. s. i. g. The mole ratio of steam to hydrocarbon was 12:1 which ratio allows continuous and steady operation. Under these conditions the selectivity was constant at about 80.5 mole percent.

When a steam rate of 20:1 was used instead of 12:1 under otherwise equal conditions and conversion, the selectivity was constant at about 80.5 mole percent. Thus, the selectivity was not changed at all even though the partial pressure of hydrocarbon was reduced from 0.115 atmosphere to 0.07 atmosphere by the greater steam dilution.

Regardless of the importance ascribed to the partial pressure of the hydrocarbon these results, as well as those reported in the literature, indicate the desirability, if not necessity, of using a large amount of diluent steam.

It has now been found that, contrary to previous belief and to expectation, the selectivity is a function of the partial pressure of steam and that, under proper conditions, the selectivity is favored by lowered steam partial pressures. This is illustrated in the data presented in Figure II of the accompanying drawing.

Figure II

Figure II is a graph wherein the conversion efficiencies in mole percent for 20% conversion at 350 v./v./hr. space velocity are given on the ordinate the partial pressures of steam in atmospheres are given on the abscissa, and wherein are plotted various experimental points obtained at different steam partial pressures. The results are comparable. It will be seen that, within the limit of experimental error, the selectivity or conversion efficiency is a straight line function of the partial pressure of steam and that, contrary to previous belief, the higher conversion efficiencies are favored by low steam partial pressures. All of the points on the line were obtained under conditions where the linear velocity was well above the critical velocity. The importance of this condition is discussed below. The reason for this unexpected effect of steam is not known, but it is believed that the partial pressure of steam affects the selectivity through its affect on the oxidation state of the catalyst surface. According to this invention, considerably improved selectivities may be obtained when operating with steam partial pressures below 0.5 atmosphere, and as low as about 0.2 atmosphere.

In order, however, to obtain improved selectivities under these conditions, it is necessary that the total pressure be reduced sufficiently below atmospheric pressure that the vapors pass through the bed of catalyst at a high velocity which is at least twice the critical velocity. At a given space velocity and steam dilution ratio, the volume of gas passing through the catalyst bed, and hence the linear velocity, is increased as the pressure is reduced. The pressure is measured at the outlet of the catalyst bed, and the linear velocity used to calculate the Modified Reynolds Number is the so-called superficial linear velocity of the gases corrected to the conditions of temperature and pressure according to the ideal gas laws. The Modified Reynolds Number may be calculated as described in John H. Perry, Chemical Engineering Handbook, 1950 edition, pages 369–370 and 393, McGraw-Hill Book Company, Inc. The pressure drop through the catalyst bed is approximately directly proportional to the density and the square of the velocity of the gas. It therefore follows that, at any given space velocity and steam dilution ratio, the pressure drop through a given catalyst bed increases as the total pressure is decreased. For example, by reducing the total pressure from 2 atmospheres to 1 atmosphere absolute, the linear velocity and pressure drop are approximately doubled. The importance of maintaining the velocity above the critical is also illustrated in Figure II by the points A, B, and C where the partial pressures of steam were of the same order of magnitude but the conditions were such that the necessary velocity was not attained.

Since the inlet pressure is limited to about 0.5 atmosphere, the pressure drop through the bed cannot more than approximate the absolute inlet pressure. This therefore imposes the limitation that the catalyst bed depth be not more than about 6 feet. In practice, bed depths considerably less than this maximum, e. g., from 12 to about 32 inches, are preferred.

When operating under the conditions above specified, steam dilution ratios considerably below those otherwise possible may be employed. As pointed out above, the superficial velocity must be retained at least sufficient to give a Modified Reynolds Number at least twice the critical Modified Reynolds Number. The minimum lower ratio of steam to hydrocarbon must therefore always be sufficient at any given space velocity to give this minimum velocity. This minimum steam ratio therefore depends upon the reaction pressure. In general, steam to hydrocarbon mole ratios between about 4 and about 12 are suitable and generally preferred but the invention is not limited to ratios within this range.

It will be apparent that by maintaining a positive partial pressure of steam below 0.5 atmosphere while maintaining the total pressure sufficiently below atmospheric pressure that the linear velocity is well above the critical velocity, it is possible to obtain much improved conversion efficiencies even at relatively low steam-to-hydrocarbon ratios.

The results and conditions shown above are considered to be precise to the following degree:

| | |
|---|---|
| Butylene space velocity | ±5% of reported value. |
| Steam dilution | ±2% of reported value. |
| Temperature | ±3° C. |
| Conversion | ±2% of absolute value. |
| Selectivity | ±2% of absolute value. |
| Pressure | ±3% of reported value. |

They all refer to constant equilibrium conditions of continuous operation with the same commercial catalyst.

It is claimed:

1. In the dehydration of butylene to butadiene with an alkaline dehydrogenation catalyst in the pressure of steam diluent at a temperature of the order of 600° C. by passing butylene along with steam under the mentioned conditions through a bed of the catalyst in a reaction zone, the improvement which comprises maintaining the depth of the catalyst bed in the reaction zone less than 6 feet, maintaining in the reaction zone a positive partial pressure of steam below 0.5 atmosphere and maintaining the total pressure in the reaction zone sufficiently below atmospheric pressure that the linear velocity of the reaction vapors through the catalyst bed corresponds to a Modified Reynolds Number which is at least twice that of the critical velocity.

2. Process according to claim 1 further characterized in that the depth of the bed of catalyst in the reaction zone is maintained between 12 and 32 inches.

References Cited in the file of this patent

UNITED STATES PATENTS 2,408,139 Gutzeit _____ Sept. 24, 1946
2,626,288 Ronayne _____ Jan. 20, 1953
2,666,086 Pitzer _____ Jan. 12, 1954

FOREIGN PATENTS 628,686 Great Britain _____ Sept. 2, 1949

U. S. DEPARTMENT OF COMMERCE
PATENT OFFICE

CERTIFICATE OF CORRECTION

Patent No. 2,804,487      Lloyd R. Donkle      August 27, 1957

It is hereby certified that error appears in the printed specification of the above numbered patent requiring correction and that the said Letters Patent should read as corrected below.

Column 4, line 61, for "dehydration" read -- dehydrogenation --.

Signed and sealed this 10th day of June 1958.

(SEAL)
Attest:
KARL H. AXLINE
Attesting Officer

ROBERT C. WATSON
Commissioner of Patents